March 16, 1926.
H. M. BROWN
1,577,170
RECORDER AND INDICATOR
Filed March 17, 1920    2 Sheets-Sheet 1
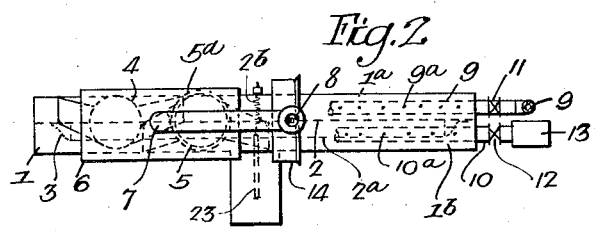
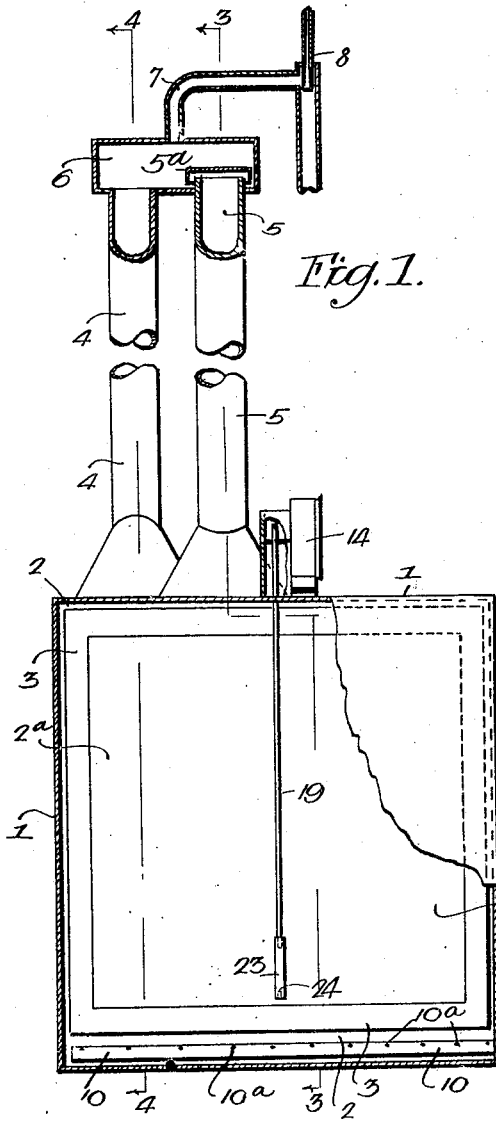
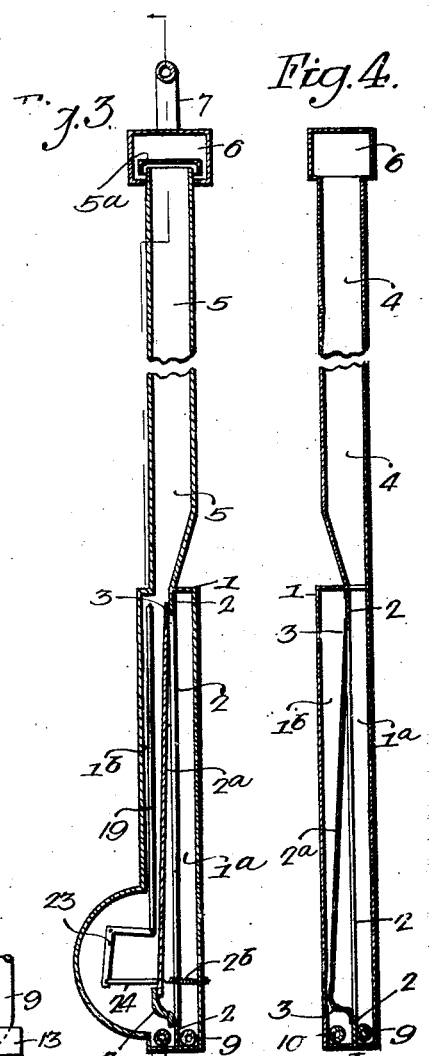
Inventor—
Howard M. Brown.
by his Attorneys.

March 16, 1926.
H. M. BROWN
1,577,170
RECORDER AND INDICATOR
Filed March 17, 1920    2 Sheets-Sheet 2
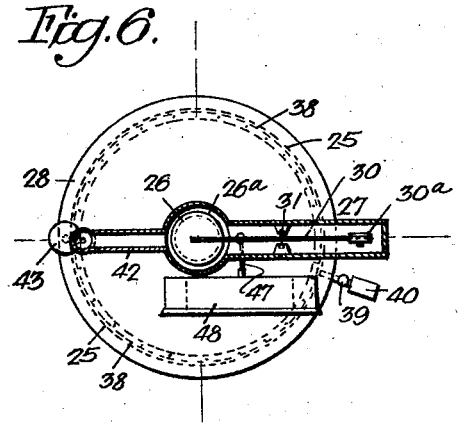
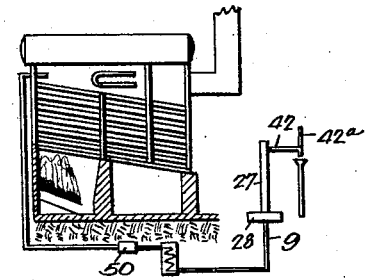
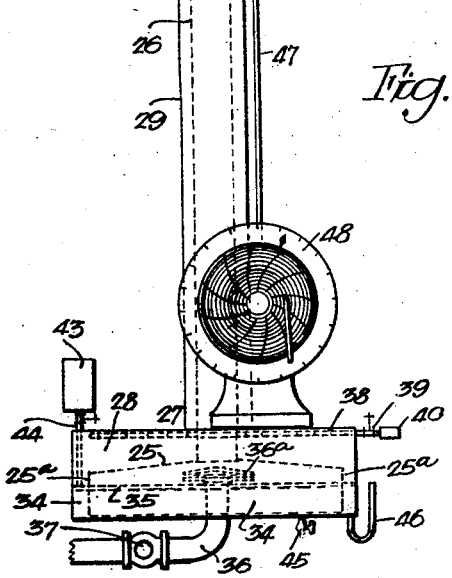
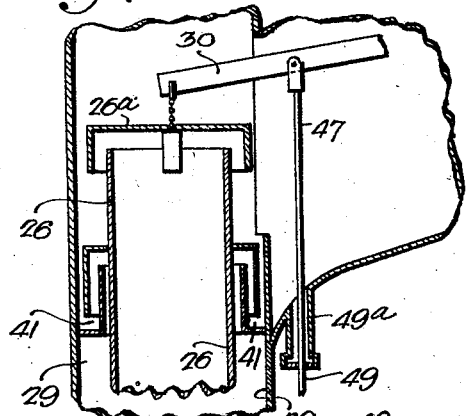
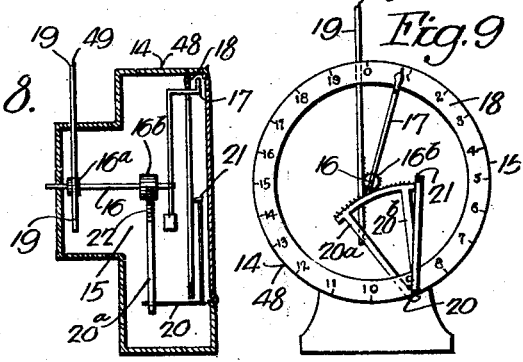
Inventor:-
Howard M. Brown
by his Attorney
Howson & Howson Patented Mar. 16, 1926.

1,577,170

UNITED STATES PATENT OFFICE.

HOWARD M. BROWN, OF CHESTER, PENNSYLVANIA.

RECORDER AND INDICATOR.

Application filed March 17, 1920. Serial No. 366,476.

*To all whom it may concern:*

Be it known that I, HOWARD M. BROWN, a citizen of the United States, residing in Chester, Delaware County, Pennsylvania, have invented certain Improvements in Recorders and Indicators, of which the following is a specification.

My invention relates to instruments for indicating the amounts of $CO_2$ present in the waste gases from furnaces and the like, and the object of my invention is to provide a simple and durable device of this nature which will assist in the economical operation of furnaces and particularly those under steam boilers. The value of $CO_2$ indicating and recording instruments in the economical operation of boiler furnaces is well recognized, but this invention has certain distinctive features and improvements over other forms of instruments used for this purpose which will hereinafter be enumerated and fully described.

In the accompanying drawings:

Figure 1 is a side elevation of one form of my indicator;

Fig. 2 is a plan view of the indicator;

Fig. 3 is a vertical section taken on the line 3—3, Fig. 1;

Fig. 4 is a vertical section taken on the line 4—4, Fig. 1;

Fig. 5 is a front elevation of a modified form of my indicator;

Fig. 6 is a horizontal section taken on the line 6—6, Fig. 5;

Fig. 7 is a vertical section of the upper portion of the indicator illustrating some of the details of my invention;

Fig. 8 is a vertical section of the indicating and recording instrument;

Fig. 9 is a front elevation of the indicating and recording instrument with the dial removed, showing the details of the mechanism, and Fig. 10 is a diagrammatic sectional view of a steam boiler indicating the manner in which my device may be attached.

My invention consists broadly of a device for measuring the difference in weight between a column of the mixture of gases discharged from a furnace, said gases comprising $CO_2$, oxygen, nitrogen, etc., and a like column of air.

The form of my device illustrated in Figs. 1, 2, 3 and 4, comprises an air-tight casing 1, preferably of metal, having a partition 2, preferably centrally disposed and consisting, in the present instance, of a light diaphragm $2^a$ suspended from the top, sides and bottom of the casing by a suitable light fabric 3 such as oiled silk or the like, sufficient fabric being used to permit the diaphragm to move laterally in the casing without appreciable friction. The amount of movement permitted the diaphragm may vary according to conditions.

Extending from the top of the casing I preferably have two tubes or chimneys 4 and 5 of substantially equal heights communicating respectively with the chambers $1^a$ and $1^b$ in the casing 1. These tubes 4 and 5 are connected together at the top by a lateral manifold tube 6, and from the chamber thus formed there passes a discharge pipe 7. The discharge pipe 7 may be connected with the smoke stack of the furnace, or an aspirator 8 may be employed, as shown in Fig. 1, to produce a suction in the discharge pipe, the aspirator being operated in the usual manner by steam, air or other suitable fluid. A cup-shaped cap such as the cap $5^a$ upon the tube 5 may be placed in inverted position above one or both of the tubes, the lower edge of the cup lying below the upper edge of the tube as shown. This cap acts as a seal to prevent the gas or air from one tube filtering down into the other, but does not interfere with the free flow of the gas or air from the tubes to which they are attached.

Communicating with the chamber $1^a$ is a feed pipe 9 through which gases of combustion are led from the furnace, while an air inlet pipe 10 communicates with the chamber $1^b$. These pipes 9 and 10 are preferably located, as shown, in the bottom of their respective chambers and extend the entire length thereof. Vent holes $9^a$ and $10^a$ respectively may be formed at regularly spaced points along their length to provide a uniform distributed influx of gases and air. Valves 11 and 12 are provided in the pipes 9 and 10 respectively for controlling the flow of the gas and air. A screen 13 is provided upon the air inlet pipe for the purpose of removing dust and such matter from the air before it is taken into the chamber.

It will now be understood that the suction produced in the discharge pipe will draw the gases produced in the furnace through the pipe 9 into the chamber $1^a$ and tube 4, while a small amount of air is similarly drawn through the pipe 10 into the chamber 1$^b$ and tube 5. From the tubes 4 and 5 a mixture of air and gases is drawn through the discharge pipe 7. As the percentage of $CO_2$ increases in the gases passing through the pipe 9, the specific gravity of the gases increases proportionately, and the resulting increased pressure of the fluid on one side of the partition over that on the other side will cause a movement of the diaphragm 2$^a$ substantially proportionate to the difference of pressures. A spring 2$^b$ in the chamber 1$^a$ is secured to the casing wall and to the diaphragm, and this spring tends to return the diaphragm to the central normal position, which it assumes when the pressures in the chambers are balanced or when there is no $CO_2$ present in the gases taken from the furnace. Where the diaphragm or other like movable partition is of negligible weight, some retarding influence such as the spring 2$^b$ must be employed to control the movement thereof, since without this retarding influence the slightest difference in pressure developing in the two chambers would cause an instant movement of the diaphragm to the extreme limit of its motion, and this action would be too delicate for the purpose intended. The spring, however, increases the range of instrument so that a comparatively large number of different pressures may be indicated and recorded in the manner hereinafter described.

Located in the present instance above the casing 1 is an indicator 14 which is operably connected with the movable diaphragm 2$^a$ and is calibrated and adapted to register and record the relative amounts of $CO_2$ in the gases of combustion of the furnace as indicated by the movements of the diaphragm 2$^a$.

One form of registering instrument is shown in detail in Figs. 8 and 9, and consists of a casing 15 within which is mounted a central shaft 16 which carries a pointer 17 adapted to pass over the calibrated face 18. The shaft 16 also carries two pinions 16$^a$ and 16$^b$. A second shaft 20 mounted in the lower portion of the casing carries a recording needle 21, and arms 20$^a$ and 20$^b$ extending from the shaft 20 carry a segmental rack 22 which engages with the pinion 16$^b$. The mechanism is actuated by a rod 19 suitably connected with the movable diaphragm 2$^a$ and having a rack adapted to engage the pinion 16$^a$. The manner in which the motion of the diaphragm is transmitted to the rod 19 is, in the present instance, through the medium of a bell crank lever 23, one end of which is attached to the lower end of the said rod and the other end to a rigid link 24 attached to the diaphragm near the bottom thereof. Movement of the diaphragm thus gives the rod 19 vertical and corresponding motion.

As previously stated, the gases from the boiler are drawn continuously into the chamber 1$^a$ through the pipe 9, and air is drawn through the pipe 10 into the chamber 1$^b$, the drawing force which tends to draw the gas and the air through their respective pipes being the same since both of the pipes 9 and 10 leading from the chambers 1$^a$ and 1$^b$ are connected to the same discharge pipe 7 which provides the required amount of suction force. It will be apparent that any difference in pressure existing in the chambers 1$^a$ and 1$^b$ will result in a movement of the diaphragm 2$^a$ toward the chamber in which the lesser pressure exists, and this movement of the diaphragm will be indicated by the pointer 17 upon the indicator, which is properly calibrated to give the difference in pressure existing in the two chambers. Difference in pressure in the chambers 1$^a$ and 1$^b$ being known for the normal amount of $CO_2$, any decrease or increase in this amount of $CO_2$ will be indicated by the pointer and also recorded by the needle.

In Fig. 5, I have illustrated a modified form of my indicator, which comprises a cup-shaped piston 25, to which is connected a tube 26, said tube and piston being established within an air-tight casing 27, consisting of a tank 28, in which the piston 25 is located, and a tube or stack 29 into which extends the tube 26. The tube 26 and piston 25 are suspended from a beam or arm 30, which is pivoted to the casing at 31, and which carries an adjustable counterweight 30$^a$ upon the outer end. A spring 32 may be attached to the outer end of the beam 30 and to the casing 27 for controlling the movement of the beam, and an adjusting nut and screw 33 are preferably connected to the spring through the top of the casing for adjusting the spring to the desired tension. The bottom of the piston 25 is left open, and the sides 25$^a$ of the said piston, which are preferably very thin and light, extend downwardly into a body of some fluid which is contained in the tank 28. This fluid is preferably water with a film of thin oil, such as kerosene, on top, the water being indicated by the numeral 34, and the oil by 35, the purpose of the oil being to prevent adherence of particles of water to the sides of the piston when it is raised.

A pipe 36 leading from the furnace extends through the bottom of the tank 28, the inner end of the pipe extending above the level of the water and oil beneath the piston 25, and a distributor 36$^a$ upon the end of the pipe provides for proper distribution under the piston of the gases of combustion which are drawn from the furnace through this pipe 36. A three-way cock 37 in the pipe 36 permits the complete closing of the pipe 36, or the shutting off of the flow of gases and the opening of the pipe for the passage of air to the inside of the piston. A second pipe 38 extends into the upper portion of the tank, and through this pipe 38 a suitable supply of air may enter the said tank. The pipe 38 is in all respects similar to the pipe 10 previously described, and like the pipe 10 has a control valve 39 and a strainer 40. A gas seal 41 is preferably interposed between the inside of the tube 29 and the outside of the tube 26, and a cap 26ª similar to the cap 5ª shown in Fig. 1 and employed for the same purpose, may be located above the upper end of the tube 26. A make-up tank 43 is provided, said tank being air-tight and having a connecting tube 44 extending through the casing 27 and just reaching the level of the fluid contained in the tank. If the level of the fluid in the tank becomes lower, due to evaporation, air is admitted to the make-up tank and the fluid therein flows out until the bottom of the tube is again sealed. A drain cock 45 is preferably provided in the bottom of the tank 28, and an overflow U-tube 46 may be employed, the bottom of the U-tube being below the bottom of the tank however so as to remain sealed if there should happen to be an abnormal vacuum in the device. In the upper end of the tube 29 is an exhaust pipe 42 in the present instance provided with an aspirator 42ª whereby the required amount of suction may be produced in both the tubes 26 and 29.

A connecting rod 47 extends from the beam 30 to an indicator 48 of the type already described, said rod 47 passing through a suitable sealing diaphragm 49, which may consist of a thin rubber sheet or disk held in the projecting tube 49ª and having a small aperture through which the rod passes, said aperture being smaller in diameter than the rod. It will now be apparent that any difference in weight between these two columns of gas of substantially the same height will be marked by a movement vertically of the piston 25 and the tube 26, and this motion of the tube 26 will be transmitted through the beam 30 and the rod 47 to the indicator 48. Thus, the position of the piston for a normal amount of $CO_2$ being known, the relative densities of the two columns of air and gas, and hence the relative amounts of $CO_2$ present in the fluid gases, may be determined, the indicator being calibrated so that the movement given the pointer on the scale will read percentage of $CO_2$.

As an alternative means instead of the spring 32 for controlling the movement of the piston 25 and tube 26, the submerged sides of the piston 25 may be made of a predetermined thickness so that the weight of the piston and tube increases regularly and proportionately as the piston leaves the fluid, this increase in weight acting as an automatic check and control.

In the pipe line conveying the gases from the furnace to the instrument, there should be placed at some suitable location a strainer 50, shown in Fig. 10, which will prevent particles of carbon, ashes, &c., from entering the instrument. A coil of pipe through which the gases are led should also be placed in the pipe line, said coil being either air or water-cooled. The purpose of this coil is to reduce the temperature of the gases to that of the atmosphere so that a comparison can be made of the two mixtures—air and the products of combustion, at the same temperature.

The advantages of my $CO_2$ indicating and recording instrument over the instruments in use at the present time are many, the distinctive features of my invention over other makes of instruments being among others, simplicity of construction, comparative durability, elimination of chemicals required to absorb the $CO_2$, and the necessity for a minimum of attention in daily operation, the attention required consisting merely of placing upon the indicator the daily chart and occasionally checking the datum or zero point, cleaning out the filter and pipes when dirty, and an occasional renewal of the liquid in the tank to make up the loss due to evaporation. Also no skilled attendant is required, and the flow of gas to the instrument can be of such velocity that there will be an extremely small amount of lag between the time when the sample of gas leaves the boiler and the time when the $CO_2$ content is indicated.

My device, further, has the distinctly advantageous feature of continuity of action, and registers and records the $CO_2$ content of the gases continuously over a period of time and not merely periodically during such time.

I claim:

1. An indicator comprising an air-tight container having a movable wall dividing said container into two chambers, each chamber having an inlet and an exhaust opening the exhaust openings being on the same level, means for producing similar suctions at the exhaust openings, and means for indicating the lateral displacement of the movable wall when gases of different densities are present in said chambers respectively.

2. An indicator comprising an air-tight container having two chambers therein, the partitioning wall between said chambers being movable, intake openings in each of said chambers, a common exhaust for said chambers, and means for indicating the displacement of said movable portion due to a difference of pressure in the said chambers.

3. In indicating apparatus, an air-tight container having two chambers therein, the partitioning wall between said chambers being movable, means for conducting gas to one of said chambers, means for conducting air to the other of said chambers, a common exhaust for said chambers, and means for indicating the displacement of said movable partitioning wall due to unequal pressures existing in said chambers.

4. In an indicating device, the combination with an air-tight bi-chambered casing, each of said chambers having an intake opening therein, of a common exhaust for said chambers, and means comprising a movable partition separating said chambers for indicating the difference in pressure existing therein.

5. In an indicator, the combination with two air-tight chambers having a movable partition therebetween, of means for passing a fluid of substantially fixed weight through one of said chambers and a fluid of uncertain weight through the other of said chambers, and means for registering the difference of pressure existing in the said chambers as indicated by the movement of the partition.

6. In an indicator, the combination with a casing having a movable partition, of a common discharge means for the chambers formed within the casing by said partition, said chambers each having an intake opening therein, and means for indicating the displacement of said movable partition due to a difference of pressure existing on opposite sides thereof.

7. In an indicator, the combination with a casing having a movable partition dividing the interior thereof, of a pair of tubes communicating with the casing, one at each side of the said partition, said casing having an intake opening at each side of the partition, a common exhaust for said tubes at the outer ends thereof, and means for indicating the displacement of said movable partition due to unequal pressures on opposite sides thereof.

8. In an indicator, the combination with a casing having a movable partition dividing the interior thereof and an intake opening on each side of said partition, of a common discharge pipe for the chambers formed by said partition, means for producing a suction in discharge pipe, and means for registering the movement of said movable partition.

9. In an indicating instrument, the combination with an air-tight casing having a movable partition and an intake opening on each side of said partition, of a pair of vertical tubes communicating with said casing one on each side of said partition, a common discharge chamber at the top of said tubes having an exhaust opening therein, and means for producing a suction in said exhaust opening.

10. In indicating mechanism, the combination with an air-tight casing, of a diaphragm disposed within said casing and joined to said casing walls by a flexible and air-tight fabric, said fabric and diaphragm forming a partition within said casing and said casing having an intake opening on each side of the said partition, a vertical tube communicating with said casing on each side of the partition, a common discharge chamber at the top of said tubes having an exhaust opening therein, and means for indicating the displacement of the diaphragm due to unequal pressures on opposite sides thereof.

11. In indicating mechanism, the combination with an air-tight casing, of a diaphragm disposed therein, said diaphragm being attached to the walls of said casing by means of an air-tight flexible fabric, said diaphragm and fabric forming a partition within said casing, and an indicator operatively connected with said diaphragm and adapted to indicate the displacement of the diaphragm due to the unequal pressures on opposite sides thereof.

12. The combination with an air-tight casing having a movable partition forming chambers therein, of a vertical tube communicating with each of said chambers, said tubes having substantially the same height, a common exhaust chamber at the top of said tube having an exhaust opening therein, a gas pipe leading to one of said chambers, an air pipe leading to the other of said chambers, and an indicator operatively connected with the movable partition and adapted to indicate the difference of pressure existing upon opposite sides of said partition as indicated by the displacement of said partition.

13. In an indicating device, an air-tight casing having a movable partition therein, said casing having an intake opening therein on each side of said partition, a pair of tubes of substantially equal heights extending from said casing one on each side of said partition, a discharge chamber at the top of said tubes having an exhaust opening therein, a spring controlling the movement of said partition, and means for indicating the displacement of said partition due to unequal pressures on opposite sides thereof.

14. In indicating mechanism, the combination with a bi-chambered air-tight casing, the partition between said chambers being movable, of a pipe for conducting the gases of combustion from a furnace to one of said chambers, means for cooling the gas to normal atmospheric temperature before it enters said chamber, means for conducting air to the other of said chambers, and means for indicating the displacement of said movable partition due to unequal pressures in the said chambers.

15. The method of indicating variations in the proportions of a gas mixture which comprises passing the gas mixture and a second gas of fixed proportions up separate pipes to establish vertical columns in the pipes, and noting variations in the relative pressures at the bases of the vertical columns.

16. In an apparatus for indicating variations in the proportion of a gas mixture such as variations in the amount of $CO_2$ in flue gases, the combination of a differential pressure gauge, two vertical pipes connected thereto and extending thereabove, means for passing a gas of known density up one of said pipes, and means for passing a gas mixture, the proportions of which may vary, up the other of said pipes.

17. An apparatus for indicating variations in the proportions of a gas mixture comprising a differential pressure gauge, two vertical pipes of definite relative lengths connected to said gauge at their lower ends whereby the gauge is subjected to the pressures in said pipes, and means for continuously passing a gas up each of said pipes.

HOWARD M. BROWN.